US007854164B2

(12) United States Patent
Bosselmann et al.

(10) Patent No.: US 7,854,164 B2
(45) Date of Patent: Dec. 21, 2010

(54) FLOWMETER FOR DETERMINING A FLOW DIRECTION

(75) Inventors: Thomas Bosselmann, Marloffstein (DE); Michael Willsch, Jena (DE)

(73) Assignee: Siemens Aktiengesellschaft, Munich (DE)

( * ) Notice: Subject to any disclaimer, the term of this patent is extended or adjusted under 35 U.S.C. 154(b) by 2 days.

(21) Appl. No.: 12/225,115

(22) PCT Filed: Feb. 6, 2007

(86) PCT No.: PCT/EP2007/051124

§ 371 (c)(1),
(2), (4) Date: Sep. 15, 2008

(87) PCT Pub. No.: WO2007/104614

PCT Pub. Date: Sep. 20, 2007

(65) Prior Publication Data

US 2009/0107231 A1 Apr. 30, 2009

(30) Foreign Application Priority Data

Mar. 16, 2006 (DE) ....................... 10 2006 012 230

(51) Int. Cl.
*G01F 13/00* (2006.01)

(52) U.S. Cl. .................................................. 73/170.12

(58) Field of Classification Search ....................... None
See application file for complete search history.

(56) References Cited

U.S. PATENT DOCUMENTS 5,517,862 A 5/1996 Berrong
5,793,216 A * 8/1998 Constant .................... 324/639
6,865,956 B2 * 3/2005 Yamamoto ............... 73/861.12
7,302,844 B2 * 12/2007 Birkle et al. ............. 73/204.23

FOREIGN PATENT DOCUMENTS

| | | | |
|---|---|---|---|
| DE | 4242132 | A1 | 6/1994 |
| DE | 10162592 | A1 | 6/2002 |
| EP | 0853370 | A1 | 7/1998 |
| EP | 1591627 | A1 | 11/2005 |
| GB | 2401430 | A | 11/2004 |
| JP | 2005172713 | A | 6/2005 |
| WO | WO2004042326 | A2 | 5/2004 |

* cited by examiner

*Primary Examiner*—Andre J Allen
(74) *Attorney, Agent, or Firm*—Staas & Halsey LLP

(57) ABSTRACT

A flowmeter determines the flow direction of a fluid. The flowmeter has a measuring element, around which the fluid flows. The measuring element has fiber-optic cable and at least two electrical heating elements that lie adjacent to the fiber-optic cable(s) by which a respective heat stream emanating from the respective heating element and directed towards the fiber-optic cable, the directions of the heat streams being at least proportionately reversed. In addition, depending on the flow direction of the fluid, the individual heat streams are correlated to different extents with the flow direction. An electromagnetic wave that can be coupled into the fiber-optic cable(s) can also be influenced according to the temperature of the fiber-optic cable(s). Additionally, the flowmeter has a control unit, which is used to feed electric energy to the two or more heating elements, one after the other, and an evaluation unit, which is used to evaluate the temperature effect of the electromagnetic wave emanating from the individual heat streams and to determine the flow direction of the fluid.

23 Claims, 7 Drawing Sheets

30
22
11
9
10b
2
6a(8)
16
10a
10b
22
6b(8)
Z
80
11
4
Y
X 22
3
12
10b
9
7a(8)
4
10a
10b
7b(8)
22
30
12
22
Z
80
Y
X 21
24
20
23
25
26
1
8
5b
5a
Z
X
Y
80
13
22
4

21
24
20
26
23
25
1
8
5b
5a
Z
X
Y
80
13
22
4

21
24
20
23
25
26
2 (3)
6b
(7b)
6a(7a)
Z
X
Y
80
13
22
4

FLOWMETER FOR DETERMINING A FLOW DIRECTION

CROSS REFERENCE TO RELATED APPLICATIONS

This application is based on and hereby claims priority to German Application No. 10 2006 012 230.5 filed on Mar. 16, 2006 and PCT Application No. PCT/EP2007/051124 filed on Feb. 6, 2007, the contents of which are hereby incorporated by reference.

BACKGROUND OF THE INVENTION

The present invention relates to a flowmeter for determination of a flow direction of a fluid. The invention also relates to a method for determination of a flow direction of a fluid, and to an electrical machine having the flowmeter.

In all rating classes of electrical machines, but in particular relatively high rating machines, a considerable amount of heat is developed which must be dissipated by cooling measures in order to achieve better machine efficiency and/or a longer life. By way of example, air-cooled machines such as generators or motors are known, in particular with ratings of less than 300 MVA, in which cooling is provided by a comparatively large air flow. This air flow may in particular be passed through a line system which comprises numerous flow channels (cf. for example DE 42 42 132 A1 or EP 0 853 370 A1). For example, the flow channels of the line system can be used to force air from the outside inward through the stator of the machine. At the same time, however, air is sucked in by the machine rotor and is forced from the inside outward through the stator, in the opposite direction. If the two air flows are superimposed disadvantageously, the flow ceases to flow within the line system, therefore possibly leading to local overheating of and damage to the machine.

WO 2004/042326 A2 specifies a flowmeter for determining a flow rate of a flow which is flowing around a measurement element in the flowmeter, such as a gas flow, having an optical waveguide which has a plurality of fiber Bragg gratings and having at least one electrical heating element which is arranged adjacent to the waveguide. This allows the flow rate along the longitudinal extent of the measurement element to be determined from the influence of the temperature on the conductor on an electromagnetic wave which is fed into the optical waveguide. The optical waveguide can be heated via the electrical heating element with a constant amount of heat being applied, resulting in a temperature distribution in the longitudinal extent on the measurement element, corresponding to the local flow rate. This flowmeter is therefore suitable for determining a multiplicity of local flow rates using just one single measurement element. However, it is not possible to determine the direction in which the fluid is flowing relative to the measurement element.

SUMMARY

One potential object is therefore to provide a flowmeter and a method by which the flow direction of a fluid can be determined, and of specifying an electrical machine in which the flow direction of a cooling fluid can be monitored.

The inventors propose a flowmeter for determination of a flow direction of a fluid, having

- a measurement element around which the fluid can flow and having at least one optical waveguide and at least two electrical heating elements which are arranged adjacent to the at least one optical waveguide, in which
  - the at least one optical waveguide can have heat applied to it via a respective heat flow which is
  - directed from the respective heating element to the at least one optical waveguide,
  - at least a proportion of the directions of the heat flows are opposite,
  - the individual heat flows are correlated to different extents with the flow direction of the fluid, and
  - at least one electromagnetic wave, which can be injected into the at least one optical waveguide, can be influenced corresponding to the temperature of the at least one optical waveguide,
- a control unit, by which electrical power can be supplied successively in time to the at least two heating elements, and
- an evaluation unit, by which the temperature influence originating from the individual heat flows on the electromagnetic wave can be evaluated, and the flow direction of the fluid can be determined.

The measurement element, whose longitudinal extent is preferably arranged at right angles to the flow direction of the fluid in it, has different local flow conditions over the circumference of its cross section, which, in particular, is circular. Heat is therefore transported non-uniformly over the circumference of the cross section on the surface of the measurement element, because of the locally different flow rates of the fluid. For this reason, with the same amount of power applied to the heating elements, a heat flow of a different magnitude occurs in the direction of the at least one optical waveguide in the measurement element, depending on the position of the heating elements. By applying power sequentially in time to the individual heating wires or else by individual heating wire configurations, it is therefore possible to determine the temperature difference or else the temperature differences between the individual sequences at the location of the at least one optical waveguide and thus to deduce the flow direction of the fluid flowing around the measurement element.

It is therefore advantageous for the at least one optical waveguide to comprise at least one fiber Bragg grating and for it to be possible to influence the at least one electromagnetic wave which can be injected into the at least one optical waveguide, corresponding to the temperature of the at least one optical waveguide at the location of the at least one fiber Bragg grating. A sensor type such as this is distinguished by its particular multiplexing capability, as a result of which a sensor network can be provided in a simple manner. A further advantage of the fiber Bragg grating technology is the capability for measurement virtually at a point or points, that is to say a locally very strictly confined measurement. It is therefore possible to arrange a plurality of fiber Bragg gratings close to one another and following one another in the optical waveguide when it is necessary to achieve relatively high measurement accuracy, in particular position-resolved measurement accuracy, along the measurement element.

In order to allow better distinction, the fiber Bragg gratings which are arranged in the optical waveguide preferably each have different main wavelengths from one another. A proportion of the at least one electromagnetic wave that is fed in, with this proportion being governed by the respective main wavelength, is reflected back in each fiber Bragg grating. The main wavelength changes with the influencing variable prevailing at the measurement point, in this case in particular the temperature of the optical waveguide. This change in the wavelength content (or wavelength spectrum) of the respective portion fed back of the at least one electromagnetic wave that is fed in will be used as a measure for the influencing variable to be detected. However, in principle, it is also possible to investigate the transmitted portion of the at least one electromagnetic wave that is fed in, for the change in the wavelength spectrum. In particular, the at least one fiber Bragg grating can be checked by the at least one electromagnetic wave by a broadband light source, for example a light-emitting diode (LED) with a bandwidth of about 45 nm, a super luminescence diode (SLD) with a bandwidth of about 20 nm or a tunable laser with a bandwidth of about 100 nm.

It is proposed that the measurement element be in the form of a rod. The measurement element can advantageously be fitted easily and, for example, can be introduced into the flow channel through an opening. Furthermore, the measurement element can be maintained with little fitting effort. For this purpose, the corresponding attachments are released and the measurement element is pulled out through the opening. In addition, of course, the measurement element may be in any other desired form. For example the measurement element may be circular or else in the form of an Archimedes screw.

A further refinement proposes that the measurement element be elastic. Depending on the purpose, the measurement element can therefore advantageously be pre-shaped quickly, thus making it possible to reduce the number of different measurement element shapes. Storage costs can be saved.

It is advantageous for the heating elements to be formed from metal. This ensures uniform heating along the heating elements.

It is also proposed that the heating elements be formed by electrically conductive coatings, which are electrically isolated from one another, on the at least one optical waveguide. This makes it possible to further simplify the form of the measurement element. The heating elements can therefore each be integrally connected in a simple manner to the conductor so that this makes it possible to achieve not only low-cost production but also a protective function for the conductor by the heating elements. The conductive coatings may, for example, be formed from a metal such as tungsten or else from an alloy, for example steel or the like.

It is also proposed that the heating elements each have a constant electrical resistivity. This advantageously makes it possible to apply heat uniformly to the measurement element over its longitudinal extent. For the purposes of this application, electrical resistivity means the electrical resistance per unit length.

It is also proposed that the respective resistivity be largely independent of temperature in the operating temperature range. This makes it possible for the respective heat supply associated with the individual heating elements along the longitudinal extent on the measurement element to be substantially independent of the actual local temperature. The measurement accuracy as well as the reliability of the measurement can be increased. For this purpose, by way of example, the heating elements may be formed from a material such as constantan or the like.

One advantageous development proposes that the measurement element have a sheath. The measurement element can thus, for example, be protected against chemical attack. Furthermore, the sheath allows mechanical protection, for example during fitting.

It is furthermore proposed that the sheath be composed of a ceramic material. Using the ceramic sheath, a measurement element for high temperature demands can advantageously be formed.

In addition, it is proposed that at least a proportion of the sheath be formed by a metal sleeve. By way of example, this advantageously makes it possible to protect the measurement element against electrostatic charging, since the metal sleeve can be connected to a ground potential.

It is also proposed that the sheath at the same time have the heating elements, with the heating elements being electrically isolated from one another. Components and costs can be further reduced.

The inventors also propose a method for determination of a flow direction of a fluid by a flowmeter, in which at least one electromagnetic wave is injected into at least one optical waveguide of a measurement element around which the fluid flows, at least two heating elements of the measurement element are supplied with electrical power successively, such that the at least one optical waveguide has heat applied to it alternately from the heating elements, and the at least one electromagnetic wave is influenced to different extents successively in time as a function of the different, changing local temperature in the optical waveguide, the different, alternating influences of the at least one electromagnetic wave are determined, and the flow direction of the fluid at right angles to the longitudinal extent of the measurement element is determined from this.

The method results in the advantages which have been explained above for the flowmeter.

It is therefore also advantageous for the at least one optical waveguide to comprise at least one fiber Bragg grating and for the at least one electromagnetic wave to be influenced as a function of the different, changing local temperature at the location of the at least one fiber Bragg grating.

It is also proposed that the at least one electromagnetic wave be formed by at least one electromagnetic pulse. This advantageously allows energy to be saved and the measurement accuracy to be increased. By way of example, the electromagnetic pulse may be produced by a pulsed laser, which is injected via a suitable known coupling unit into the optical waveguide for the electromagnetic wave.

It is also proposed that the measurement element be heated alternately in its longitudinal extent by the heating elements. Temperature variation along the measurement element as a result of the fluid flow can advantageously also be used to determine the flow rate along the measurement element.

It is advantageous for a constant electrical power to be applied alternately to each of the heating elements. Particularly with a resistance profile which is constant over the longitudinal extent of the measurement element, this in each case allows a constant amount of heat to be applied, in accordance with Ohm's Law. This can be achieved by a direct current or else alternating current. In particular, the heating effect of the respective heating elements can be influenced by variation of the alternating-current frequency if the frequency moves into a range in which current displacement effects act.

One advantageous development of the method proposes that a plurality of measurements be carried out with a different power applied. This allows the measurement accuracy to be increased further.

It is also proposed that a gas, in particular air, or a liquid, in particular water or liquid nitrogen, for cooling an electrical machine, in particular a generator or a motor, be used as the fluid. The measurement element used in the flowmeter can in this case be matched cost-effectively to the physical and/or chemical requirements in the flow channel of a cooling device of the generator or of the motor. Furthermore, a flow distribution in the cross section of a flow channel can likewise be measured accurately.

Furthermore, the inventors propose an electrical machine having a rotor which is mounted such that it can rotate, an associated fixed-position stator in a machine housing, a device for cooling parts by a fluid within the machine housing, with the cooling device containing a line system, and a flowmeter.

In this case, a measurement element, which is arranged in a flow channel of the line system, of the flowmeter is provided in order to measure the flow direction of the fluid in the flow channel.

The electrical machine gains the advantages as explained above for the flowmeter.

The flowmeter makes it possible to achieve efficient cooling of the machine by monitoring the flow direction of the cooling fluid, for example air, in the flow channels of the cooling device. Any cessation of flow that occurs as a result of disadvantageously superimposed flows can in this case be identified sufficiently early that suitable measures can be taken in order to avoid local overheating of and damage to the machine.

The reliability of operation of the flow machine can therefore be increased.

It is proposed that the measurement element be arranged radially with respect to the cross section of the flow channel. In this case, the flow direction can advantageously be determined as a function of the radius of the flow channel cross section using a plurality of fiber Bragg gratings arranged one behind the other. A plurality of measurement elements may, of course, also be provided in the flow channel in order to make it possible to determine the flow direction at different circumferential positions of the flow channel.

It is also proposed that a plurality of measurement elements be arranged at a distance from one another axially in the flow channel. This advantageously allows axial changes in the flow direction to be recorded and evaluated. It is also possible to use a plurality of differently shaped measurement elements in order to obtain the desired information about the flow profile. For example, it is possible to combine radial measurement elements in the form of rods with measurement elements arranged along a circular line in the flow channel. In particular, it is proposed that the measurement elements be operated using the method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
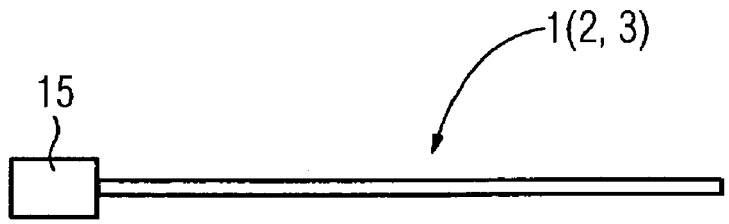
FIG. 1 shows a side view of a measurement element of the proposed flowmeter in the form of a rod, with a connecting plug at one end.

Reference will now be made in detail to the preferred embodiments of the present invention, examples of which are illustrated in the accompanying drawings, wherein like reference numerals refer to like elements throughout.

FIG. 1 shows a side view of a measurement element 1, 2 or 3 of the flowmeter having a plug connection 15, which is fitted to one end of the measurement element 1, 2 or 3, for connection of the measurement element 1, 2 or 3 to a control unit 20 and an evaluation unit 23 (see FIGS. 6 to 8 and FIG. 10). The measurement element 1, 2 or 3 is in the form of a rod. Furthermore, the measurement element 1, 2 or 3 may be elastic, thus allowing the geometric shape to be matched to the specified requirements.

In FIGS. 2 to 9, a coordinate system 80 is in each case associated with an x, y and a z axis in order to assist clarity. For the sake of simplicity, and without any restriction, it is assumed that the fluid 22 to be investigated is flowing in the x direction. The fluid 22 which is flowing in the x direction is in this case indicated by arrows pointing in the x direction. The fluid 22, which is flowing in the x direction and arrives at the measurement element 1, 2, or 3 which extends in the y direction, flows around the latter. In particular, the fluid flow is a turbulent flow. Different flow rates occur on the surface 9 of the measurement element 1, 2 or 3. The length of the arrows in this case reflects the magnitude of the fluid velocity at the indicated location. While the velocity is highest on that part of the measurement element surface 9 which is directed substantially in the opposite direction to the flow direction, it is lowest on that part of the measurement element surface 9 which points substantially in the flow direction. In this case, heat is transported through the measurement element surface 9 in homogeneously, as a function of the local flow rate. The heat transport on that part of the measurement element surface 9 which is directed substantially in the opposite direction to the flow direction, is therefore greater than on that part of the measurement element surface 9 which points substantially in the flow direction. A heating element 5*a*, 6*a* or 7*a* which is arranged at or relatively close to that part of the measurement element surface 9 which is directed substantially in the opposite direction to the flow direction thus produces less heat flow 10*a* in the direction of an optical waveguide 4 which, in particular, is arranged centrally, than a heating element 5*b*, 6*b* or 7*b* which is arranged at or relatively close to that part of the measurement element surface 9 which points substantially in the flow direction and whose heat flow is annotated with 10*b*. The arrows which originate from the heating elements 5*a*, 5*b*; 6*a*, 6*b* or 7*a*, 7*b* and point in the direction of the respective optical waveguide 4 in this case indicate the corresponding heat flow 10*a*, 10*b*, whose magnitude is reflected in the respective arrow length.

Figure 2:
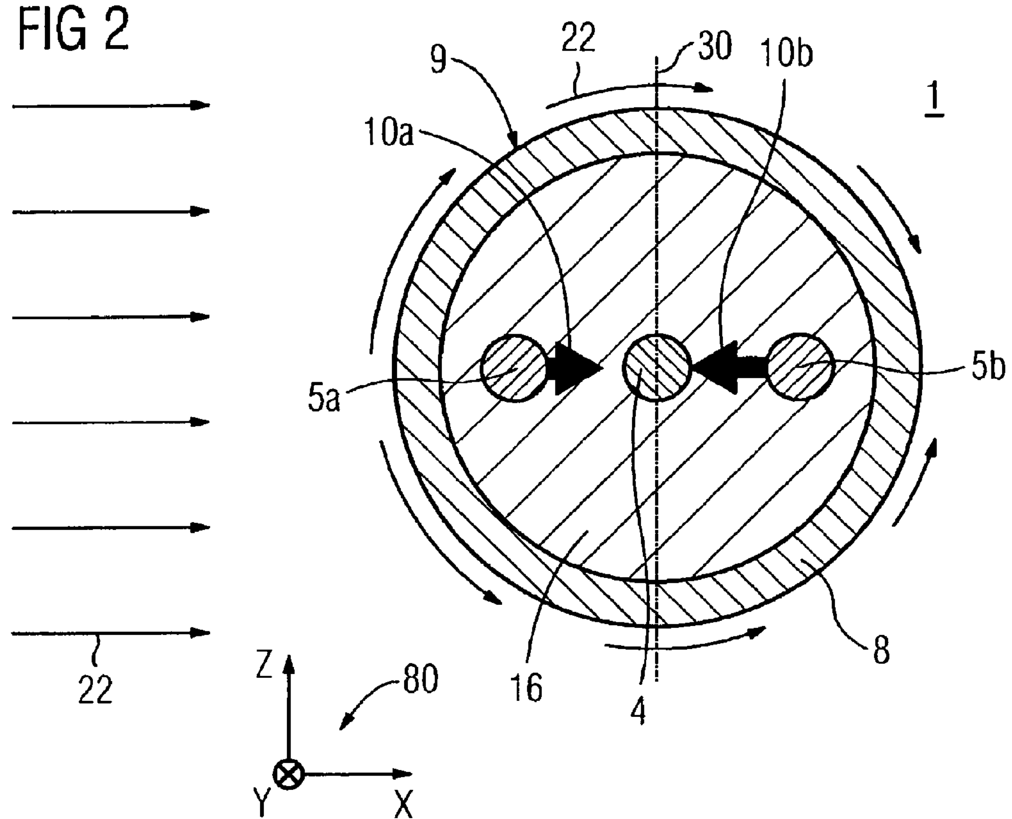
FIG. 2 shows a section through one refinement of a measurement element having an optical waveguide and two heating conductors arranged parallel thereto.
Figure 3:
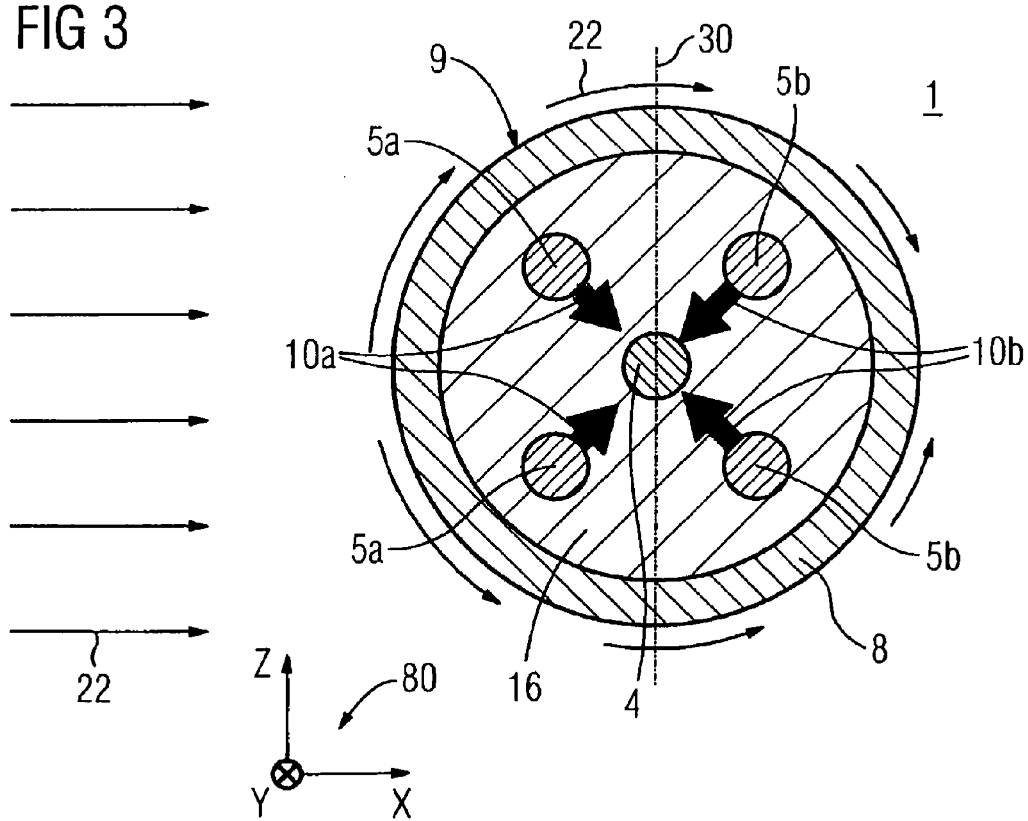
FIG. 3 shows a section through one refinement of a measurement element having one optical waveguide and four heating conductors arranged parallel thereto.

FIGS. 2 and 3 show two refinements of a measurement element 1 of the flowmeter.

According to the exemplary embodiment in FIG. 2, two heating elements 5*a*, 5*b* and an optical waveguide 4 arranged between them are contained, embedded in a ceramic material in the measurement element 1. One heating element 5*a* is arranged close to that part of the measurement element surface 9 which is directed substantially in the opposite direction to the flow direction, while the other heating element 5*a* is positioned close to that part of the measurement element surface 9 which is directed substantially in the flow direction. One optical waveguide 4 is arranged on an axis of symmetry 30 of the measurement element 1, which axis at the same time represents the mirror axis with respect to the two heating elements 5*a*, 5*b*, such that the respective distances between them and the two heating elements 5*a*, 5*b* correspond to one another. According to the exemplary embodiment in FIG. 3, there are four heating elements 5*a*, 5*b* which are located in pairs close to that part of the measurement element surface 9 which is directed substantially in the opposite direction to the flow direction and, respectively, close to that part of the measurement element surface 9 which is directed substantially in the flow direction. The optical waveguide 4 is arranged on an axis of symmetry 30 of the measurement element 1, which axis at the same time represents the mirror axis with respect to the heating element pairs 5*a*, 5*b*, such that the distances between them and the respective heating elements 5*a*, 5*b* correspond to one another. The optical waveguide 4 is, for example, a glass fiber or a plastic fiber. The heating elements 5*a*, 5*b* and the optical waveguide 4 are embedded in a body 16, which is composed of ceramic material, in particular is cylindrical, and is itself surrounded by a passivating sheath 8. By way of example, the heating elements 5*a*, 5*b* are in the form of heating wires. In one embodiment, the sheath 8 can also be formed from a metal, such that it is electrically conductive (see FIG. 6).

Figure 4:
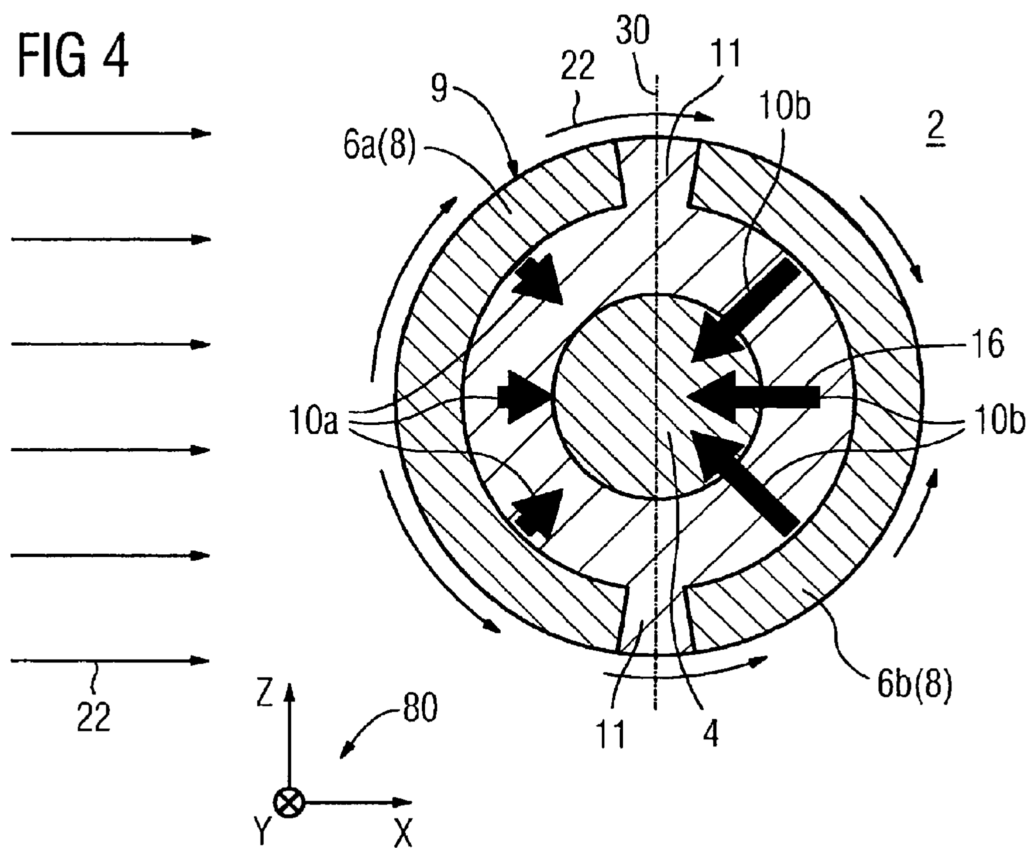
FIG. 4 shows a section through a further refinement of a measurement element having two heating elements surrounding the optical waveguide.

FIG. 4 shows a further refinement of a measurement element 2 of the flowmeter having an optical waveguide 4 which is surrounded by a body 16 which is composed of ceramic material and in particular is cylindrical. Two heating elements 6*a*, 6*b* are arranged around the ceramic body 16 such that, together, they at least partially surround the measurement element 2. In particular, the two heating elements 6*a*, 6*b* at the same time at least partially form a sheath 8, in the form of a sleeve, for the measurement element 2. The required electrical isolation between the two heating elements 6*a*, 6*b* can be provided, for example, via a respective web 11 from the ceramic body 16.

Figure 5:
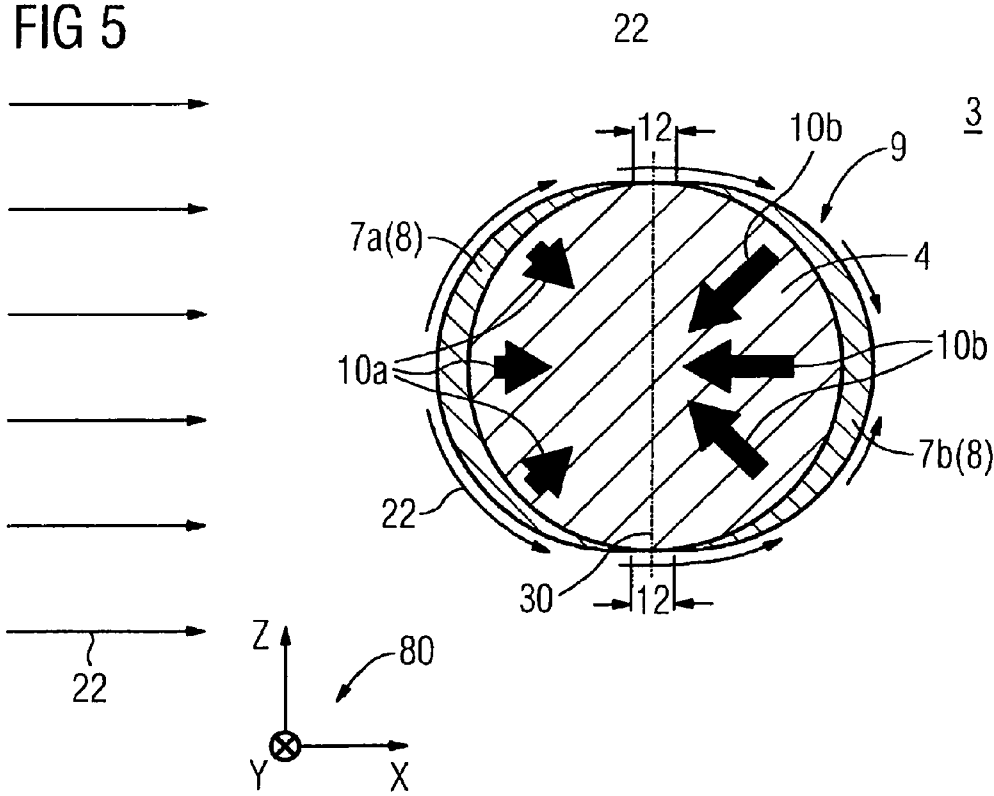
FIG. 5 shows a section through a further refinement of a measurement element having two heating elements fitted directly to one surface of the optical waveguide.

FIG. 5 shows a section through a measurement element 3 of the flowmeter, with the optical waveguide 4 having two metal layers 7*a*, 7*b* being vapor-deposited on, which metal layers are electrically isolated from one another and at the same time represent two heating elements 7*a*, 7*b* of the measurement element 3. Together, the two metal layers 7*a*, 7*b* form at least part of a sheath 8 for the optical waveguide 4. In this case, for example, the isolation between the two metal layers 7*a*, 7*b* can be provided by an air gap 12. This refinement is distinguished by elasticity such that the spatial extent of the measurement element 3 can be adapted as required. Furthermore, the measurement element 3 is distinguished by a particularly simple production process, in which the optical waveguide 4 is coated with a suitable electrically conductive material in a coating process of a conventional, known type. The refinement is also distinguished in that it has a particularly low heat capacity in comparison to the exemplary embodiments of the measurement element 1 or 2 shown in FIGS. 1 to 4, and therefore reacts more quickly to changing flow conditions.

The heating elements 5*a*, 5*b*, 6*a*, 6*b*, 7*a* and 7*b* used in the abovementioned refinements are preferably formed from a metal or from a metal alloy. By way of example, steel, copper, aluminum, bronze, constantan or the like can be used, depending on the physical and/or chemical load. For high-temperature applications, for example in the flow channel of a gas turbine, a coating with a metal such as tungsten or the like is preferable. For applications at low temperatures in a chemically aggressive environment, conductive polymers, for example, can also be used. In the exemplary embodiments illustrated here, the material of the heating elements 5*a*, 5*b*, 6*a*, 6*b*, 7*a* and 7*b* in each case has a constant electrical resistance. In particular, the resistance is largely independent of the temperature in the operating temperature range. Application of a constant current or of an alternating current with a constant root mean square value to the heating elements 5*a*, 5*b*, 6*a*, 6*b*, 7*a* and 7*b* therefore leads to a power supply which is uniform over the length of the heating elements 5*a*, 5*b*, 6*a*, 6*b*, 7*a* and 7*b*, as a result of which heat is applied uniformly to the corresponding heating elements 5*a*, 5*b*; 6*a*, 6*b* or 7*a*, 7*b* over the longitudinal extent of the respective measurement element 1, 2 or 3.

Figure 6:
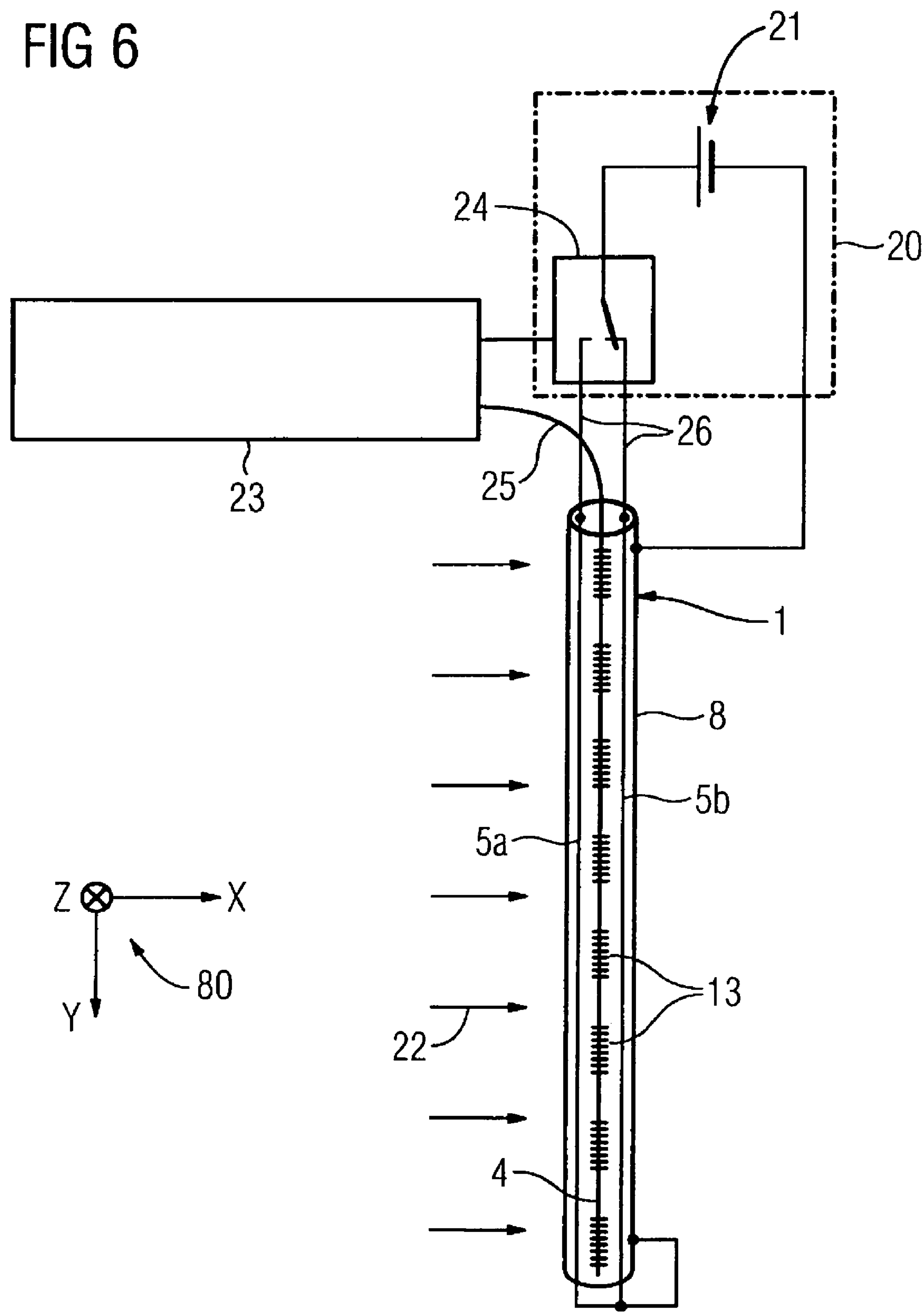
FIG. 6 shows an outline circuit diagram of one embodiment of the flowmeter with the measurement element shown in FIG. 2.
Figure 7:
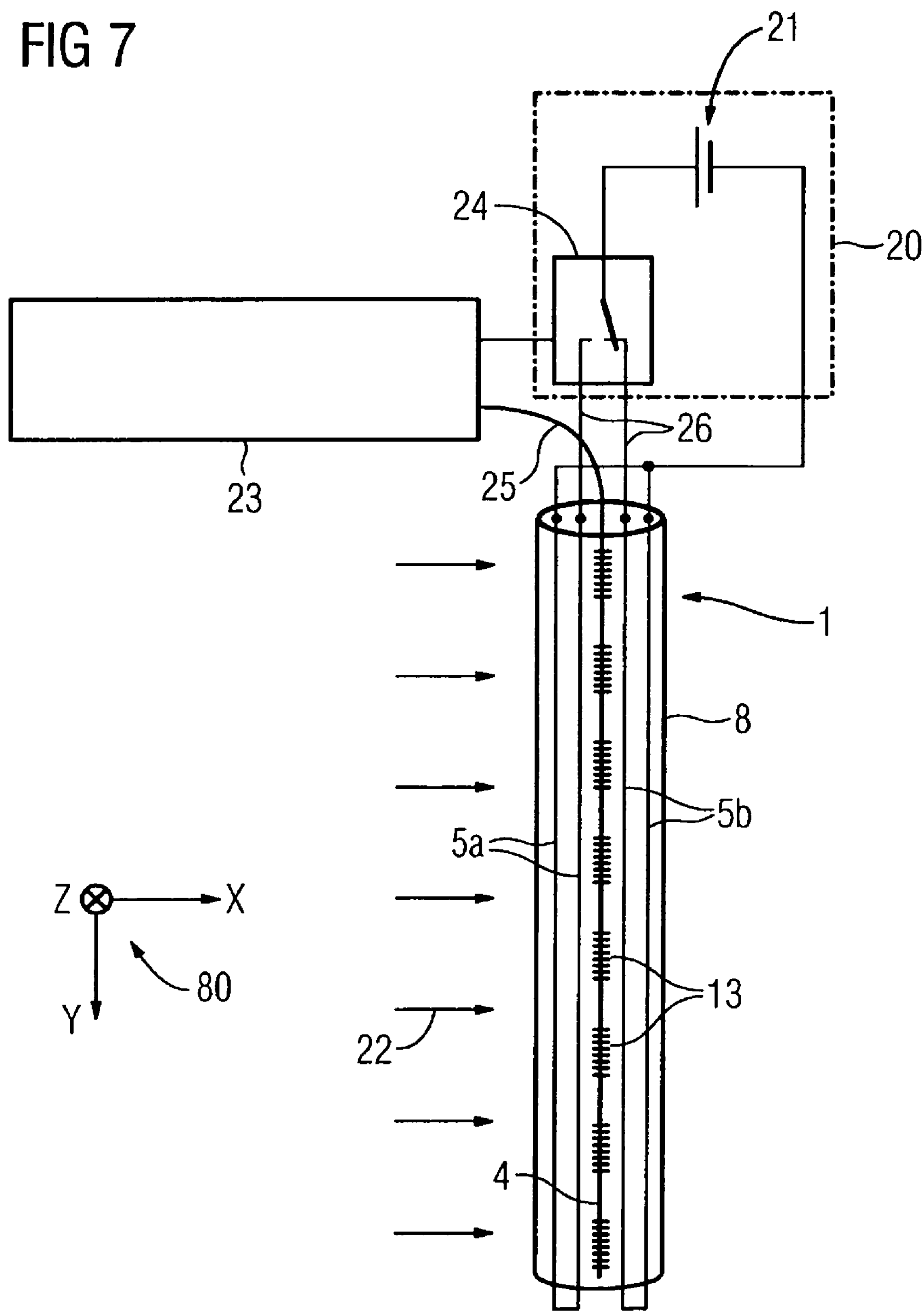
FIG. 7 shows an outline circuit diagram of one embodiment of the flowmeter, having the measurement element as shown in FIG. 3.
Figure 8:
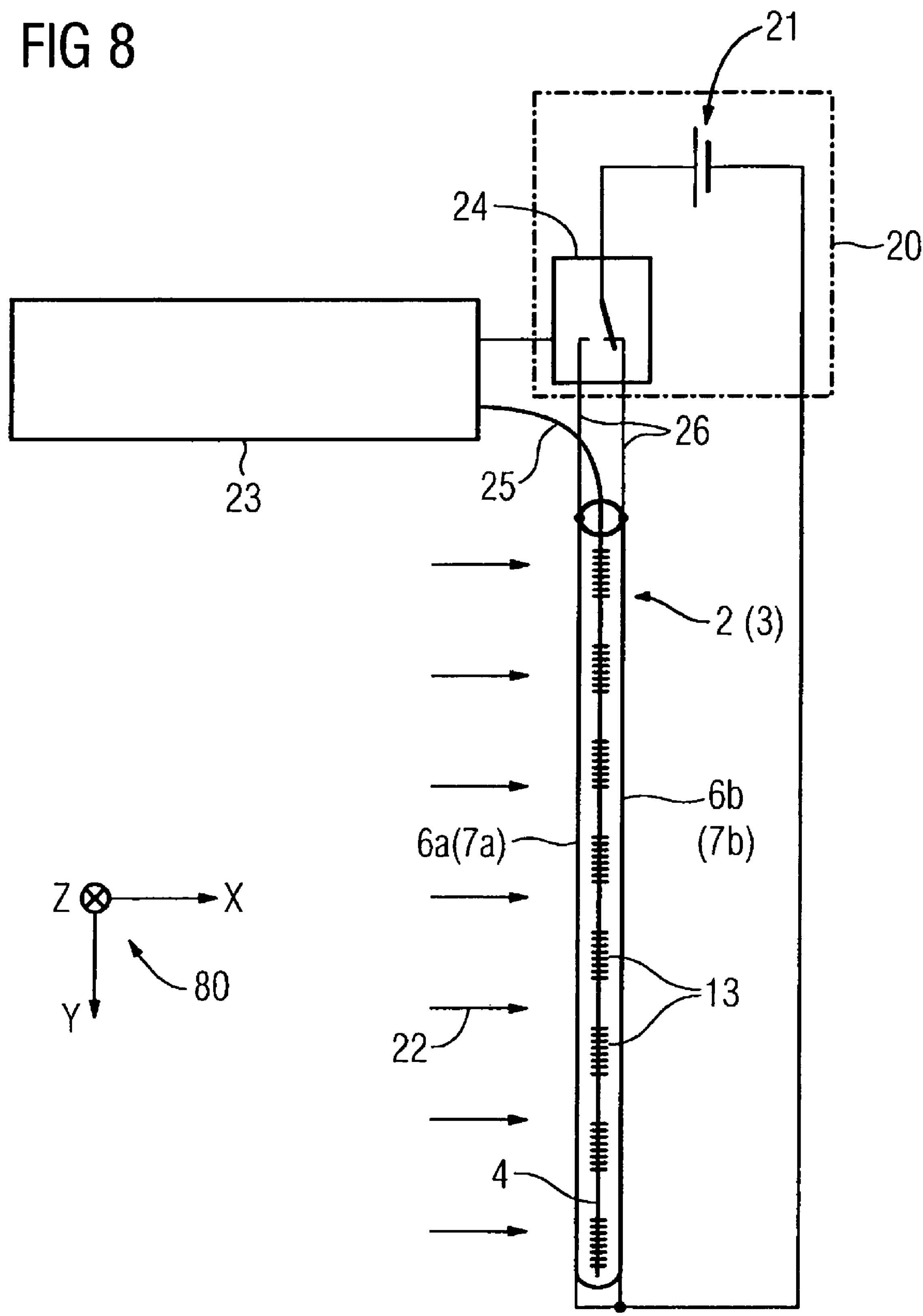
FIG. 8 shows an outline circuit diagram of one embodiment of the flowmeter with the measurement element shown in FIG. 4 or FIG. 5.

FIGS. 6 to 8 show exemplary embodiments of the flowmeter, in the form of outlined circuit diagrams. The flowmeter in FIG. 6 in this case comprises the measurement element 1 as shown in FIG. 2, the flowmeter in FIG. 7 comprises the measurement element 1 as shown in FIG. 3, and the flowmeter in FIG. 8 comprises the measurement element 2 or 3 as shown in FIG. 3 or FIG. 4, respectively. All the exemplary embodiments mentioned of the flowmeter also have a control unit 20 and an evaluation unit 23. The respective measurement element 1, 2 or 3 extends with its longitudinal axis in the y direction. The measurement element 2 or 3 of the flowmeter as shown in FIG. 8 is electrically connected at its respective ends by its heating elements 6*a*, 6*b* or 7*a*, 7*b* to the control unit 20, and at one of the two ends is optically connected to the evaluation unit 23. The measurement element 1 of the flowmeter as shown in FIGS. 6 and 7 is electrically connected at one end to the control unit 20, and is optically connected to the evaluation unit 23, while the other end of the measurement element 1 is freely available. This allows the measurement element 1 to be assembled and/or handled particularly easily.

The control unit 20 has an electrical power source 21 and a switching element 24. The power source 21, which has two connections, is, according to the exemplary embodiments, connected via the switching element 24 to the heating elements 5*a*, 5*b*; 6*a*, 6*b* or 7*a*, 7*b*, depending on its switch position, such that at least one of the heating elements 5*a*, 5*b*; 6*a*, 6*b* or 7*a*, 7*b* has electrical power applied to it, and produces heat. The electrical power source 21 is, in particular, a current source via which a constant direct current can be preset. The switching element 24 may be both a mechanical switch and an electronic switch, as are known in a large number of types and forms in the related art. However, the switching element 24 may also be formed integrally with the power source 21, in which case not just a switching function but also a control function can be provided for the current. Furthermore, the optical waveguide 4 of the measurement element 1, 2 or 3 of the flowmeter as shown in FIGS. 6 to 8 is connected via an optical connecting fiber 25 to the evaluation unit 23. The evaluation unit 23 is in turn connected to the switching element 24 via a connecting line for transmission of switching information for the switching element 24.

The fluid 22 flows around the measurement element 1, 2 or 3, in which case the fluid flow may have a different flow rate along the longitudinal extent of the measurement element 1, 2 or 3, indicated by the arrows of different length. For the sake of simplicity, as has already been stated above, the flow direction of the fluid 22 points in the x direction. In order to measure the flow direction of the fluid 22, electrical power is applied alternately to the heating elements 5*a*, 5*b*; 6*a*, 6*b* or 7*a*, 7*b* of the measurement element 1, 2 or 3 respectively, controlled via the switching element 24, such that they are heated alternately. Each individual heating process can in this case last until a thermal equilibrium has been reached in the measurement element 1, 2 or 3. However, it may also be chosen to be shorter.

Light, in the form of a continuous laser beam or in the form of laser pulses, is injected via the optical connecting fiber 25 into the optical waveguide 4 of the measurement element 1, 2 or 3 by the evaluation unit 23, which has a light source, a detector and an analyzer, and back-scattered light is analyzed using the analyzer. The measurement makes use of the effect that an electromagnetic wave which is injected into an optical waveguide 4 is scattered as it passes through the optical waveguide 4. A portion of the scattered light is scattered in the opposite direction, as a result of which it can be detected at the input of the optical waveguide 4. The temperature of the optical waveguide 4 can be deduced from the temperature dependency of this scattering effect. The back-scattered light signal comprises different components, which are differently suitable for the measurement requirements. For example, the back-scattered signal contains a Raman-scattered component. In comparison to the Raman technology the fiber Bragg grating technology allows a higher position resolution to be achieved, which is particularly preferable for use for temperature measurement in machines.

The laser light is produced in a known manner by equipment according to the related art. Depending on the temperature, a portion of the laser light in the optical waveguide 4 is scattered back from the fiber Bragg gratings 13. This back-scattered light signal is supplied via the optical connecting fiber 25 to the evaluation unit 23, which uses it to determine the temperature at the location of one or more fiber Bragg gratings 13 in the optical waveguide 4.

The corresponding temperature within the measurement element 1, 2 or 3 is determined alternately for each switch position by the evaluation unit 23, which is connected to the switching element 24 of the control unit 20. Controlled by the switching element 24 and as a function of the relative position of the respective heating element 5*a*, 5*b*; 6*a*, 6*b* or 7*a*, 7*b*, different temperatures occur in the measurement element 1, 2 or 3 in a flowing fluid 22 with a directed flow. The evaluation unit 23 is used to compare the temperatures associated with the various switch positions with one another, for example by subtraction in a computer unit which is associated with the evaluation unit 23, and the flow direction of the fluid 22 is determined from this.

If the measurement element 1, 2 or 3 has a plurality of fiber Bragg gratings 13 along the optical waveguide 4, as is indicated in the exemplary embodiments in FIG. 6 to FIG. 8, the flow rate together with the flow rate distribution of the fluid 22 can be determined from the temperature distribution along the measurement element 1, 2 or 3.

In the exemplary embodiment of the flowmeter shown in FIG. 6, the measurement element 1 has two parallel heating elements 5*a*, 5*b* in the form of heating wires. The power source 21 is connected by one connection via the switching element 24, depending on its switch position, to one of the heating elements 5*a*, 5*b*, which are in the form of heating wires, and by the other connection to the electrically conductive sheath 8 of the measurement element 1. The two heating elements 5*a*, 5*b* are in this case likewise jointly connected to the electrically conductive sheath 8, at the opposite end of the measurement element 1.

In the exemplary embodiment of the flowmeter shown in FIG. 7, the measurement element 1 has a total of four parallel heating elements 5*a*, 5*b* in the form of heating wires, with two heating wires in each case being connected together at one end of the measurement element 1. One heating element 5*a*, 5*b* of one heating element pair 5*a*, 5*b* is in this case connected, in each case, at the other end of the measurement element 1 via the switching element 24, and, depending on its switch position, to one connection of the power source 21, while the respective other two heating elements 5*a*, 5*b* of the two heating element pairs 5*a*, 5*b* are connected to one another by the other connection of the power source 21.

However, analogously to FIG. 6, it is also feasible for all four heating elements 5*a*, 5*b* to be jointly connected together at one end to the sheath 8, which in this case is designed to be electrically conductive, as a result of which the power source 21 can likewise be connected to the sheath 8 at the other end of the measurement element 1. In this exemplary embodiment, which is not illustrated, it must either in each case be possible to connect two heating elements 5*a*, 5*b* jointly and at the same time via the switching element 24 to the power source 21, or the switching element 24 must be designed such that more than two heating elements 5*a*, 5*b* can be switched successively. The use of a switching element 24 such as this with numerous connected heating elements 5*a*, 5*b* which, for example, are arranged in a circular shape around the optical waveguide 4, which is arranged in the center of the cross section of the measurement element 1, allows the flow direction of the fluid 22 to be determined even more accurately.

In the exemplary embodiment of the flowmeter as shown in FIG. 8, one connection of the power source 21 is connected via the switching element 24 and depending on its switch position to one of the heating elements 6*a*, 6*b* or 7*a*, 7*b*, which are in the form of partial sheaths 8 (FIG. 4) in the form of sleeves or metal films (FIG. 5), at one end of the measurement element 2 or 3. The second connection of the power source 21 is jointly connected at the other end of the measurement element 2 or 3 by an electrical line to both heating elements 6*a*, 6*b* or 7*a*, 7*b*.

Figure 9:
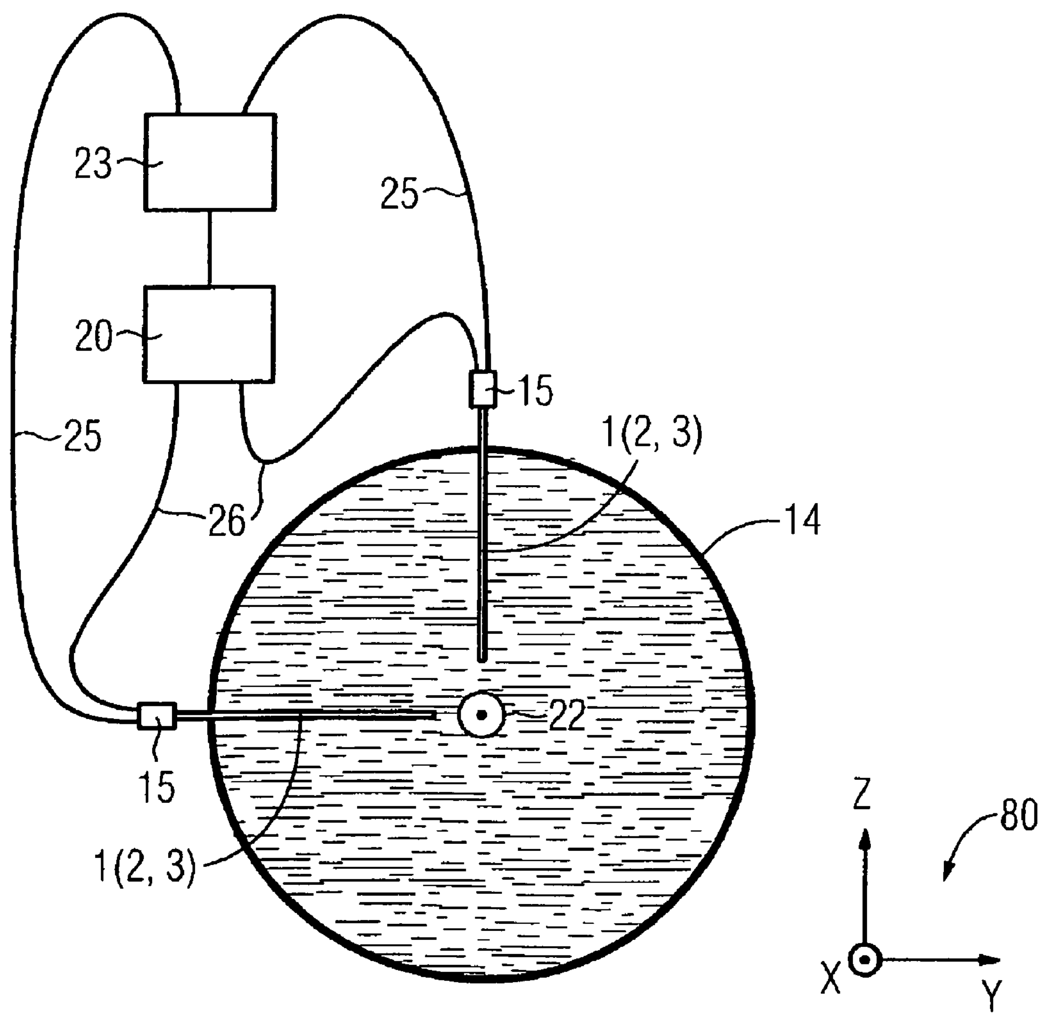
FIG. 9 shows a cross section through a flow channel of a cooling device with a measurement element of the flowmeter.

FIG. 9 shows a round cross section of a flow channel 14 through which a fluid 22 flows in the x direction. In this case, as an example, the flow channel 14 is provided with two measurement elements 1, 2 or 3, which are arranged radially with respect to the flow channel cross section. The two measurement elements 1, 2 or 3 are connected via an electrical connecting line 26 to the control unit 20, and via an optical connecting fiber 25 to the evaluation unit 23.

Figure 10:
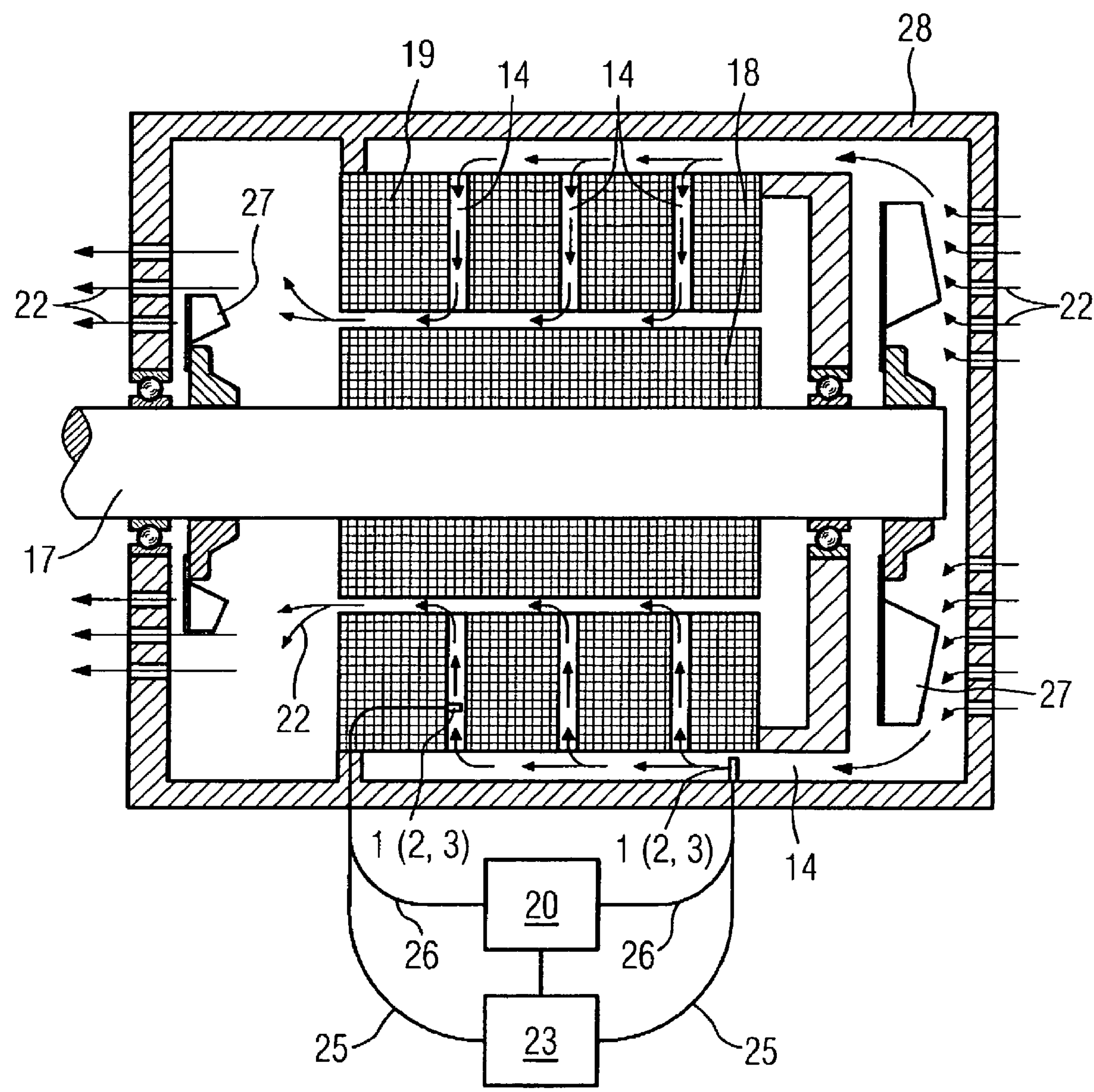
FIG. 10 shows a section through a generator with a plurality of measurement elements of the flowmeter.

FIG. 10 schematically illustrates a generator as an electrical machine. The generator has a stationary stator 19, which is firmly connected to a housing 28, and a rotor 18 which is mounted such that it can move on a rotor shaft 17. The generator is cooled, for example with air as a cooling fluid 22, by a cooling device. For this purpose, the cooling device has two fans 27 which pass the cooling air 22 through the generator by a line system. For this purpose the line system has numerous flow channels, in particular in the stator 19 as well. In the illustrated exemplary embodiment, the cooling air 22 is passed from the outside inward in the direction of the rotor 18 through the stator 19, and is then transported to the outside through a gap arranged between the stator 19 and the rotor 18. At the same time, however, air 22 can be sucked in by the rotor of the generator, and can be forced through the stator 19 in the opposite direction, from the inside outward. If the two air flows are disadvantageously superimposed, this results in the flow being stationary within the line system and therefore, possibly, in local overheating of and damage to the generator. In order to avoid this, the flow direction in the flow channels is monitored by the flowmeter. In this exemplary embodiment, two flow channels each having one measurement element 1, 2 or 3 of the flowmeter are provided, as an example, at two points in the generator. The two measurement elements 1, 2 or 3 are in this case connected to the associated control unit 20 and evaluation unit 23. In the event of irregularities in the cooling air flow, it is therefore possible to react to initiate suitable protective measures in good time.

The use of the flowmeter in an air-cooled generator in this case serves only as an example. It is also possible to use the flowmeter in electrical machines which are cooled by hydrogen gas, a noble gas or any other desired gas as the fluid 22. A cooling liquid, such as water or else in the case of cryogenic cooling a liquid noble gas or liquid nitrogen, can also be provided as the cooling fluid 22.

The flowmeter can also be used in a turbine, for example in a steam turbine or a gas turbine. By way of example, the flowmeter makes it possible to measure flow directions in particular in turbulent flow areas in the associated cooling air system, in the associated compressor, at the associated compressor inlet and/or in the corresponding exhaust gas flow.

The exemplary embodiments illustrated in the figures serve only to explain the methods and devices and have no restrictive effect on it. In particular, the type of measurement element 1, 2 or 3, in particular its geometric shape, may be varied. Furthermore, of course, a plurality of elements may also be interconnected in order to make it possible to more accurately investigate specific changes in the flow direction.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A flowmeter to determine a flow direction of a fluid, comprising:
- a measurement element around which the fluid flows, the measurement element comprising:
  - an optical waveguide to carry an electromagnetic wave, the electromagnetic wave being influenced by the temperature of the optical waveguide; and
  - at least two electrical heating elements arranged adjacent to the optical waveguide, each heating element producing a respective heat flow when activated, the heating elements being positioned such that the respective heat flows proceed in opposite directions from the respective heating elements toward the optical waveguide, the amount of heat reaching the optical waveguide from the individual heating elements correlating to the flow direction of the fluid;
- a control unit to successively in time supply electrical power to the at least two heating elements so as to alternate the electrical power from one heating element to another; and
- an evaluation unit to monitor temperature influences from the individual heat flows on the electromagnetic wave, and thereby determine the flow direction of the fluid.

2. The flowmeter as claimed in claim 1, wherein the optical waveguide comprises a fiber Bragg grating, the electromagnetic wave being influenced, corresponding to the temperature of the optical waveguide in a vicinity of the fiber Bragg grating.

3. The flowmeter as claimed in claim 1, wherein the measurement element is rod shaped.

4. The flowmeter as claimed in claim 1, wherein the measurement element is elastic.

5. The flowmeter as claimed in claim 1, wherein the heating elements are formed from metal.

6. The flowmeter as claimed in claim 1, wherein the heating elements are formed by respective electrically conductive coatings on the optical waveguide, the electrically conductive coatings being electrically isolated from one another.

7. The flowmeter as claimed in claim 1, wherein the heating elements each have a constant electrical resistivity.

8. The flowmeter as claimed in claim 7, wherein
- the heating elements have an operative temperature range, and
- for each heating element, the electrical resistivity is substantially independent of temperature within the operating temperature range.

9. The flowmeter as claimed in claim 1, further comprising a sheath at least partially enclosing the measurement element.

10. The flowmeter as claimed in claim 9, wherein the sheath is formed of a ceramic material.

11. The flowmeter as claimed in claim 9, wherein at least a proportion of the sheath is formed by a metal sleeve.

12. The flowmeter as claimed in claim 11, wherein the heating elements are incorporated into the sheath, the heating elements being electrically isolated from one another.

13. A method for determination of a flow direction of a fluid by means of a flowmeter, comprising:
- injecting an electromagnetic wave into an optical waveguide of a measurement element around which the fluid flows,
- successively supplying power to at least two heating elements of the measurement element such that the optical waveguide is heated alternately by the at least two heating elements, the heating elements being positioned with respect to the optical waveguide such that the flow direction of the fluid controls the relative amount of heat that can reach the optical waveguide from the different heating elements, the electromagnetic wave being influenced to different extents successively in time as a function of different, changing local temperatures in the optical waveguide;
- determining how the electromagnetic wave is influenced by the alternating influences of the heating elements; and
- determining the flow direction of the fluid with respect to the measurement element based on how the electromagnetic wave is influenced.

14. The method as claimed in claim 13, wherein the optical waveguide comprises a fiber Bragg grating such the electromagnetic wave is influenced by changing local temperatures in a vicinity of the fiber Bragg grating.

15. The method as claimed in claim 13, wherein at least one electromagnetic wave is formed by at least one electromagnetic pulse.

16. The method as claimed in claim 13, wherein the measurement element is heated alternately in its longitudinal extent by the heating elements.

17. The method as claimed in claim 13, wherein a constant electrical power is applied alternately to each of the heating elements.

18. The method as claimed in claim 13, wherein
- when the heating elements are alternately activated, a plurality of different electrical powers are supplied, and
- a plurality of measurements are carried out respectively at the plurality of different electrical powers.

19. The method as claimed in claim 13, wherein the fluid is a gas or a liquid for cooling a generator or a motor.

20. The method as claimed in claim 13, wherein the fluid is used to cool a machine comprising:

a rotor which is mounted such that it can rotate;

a machine housing; and a fixed-position stator associated with the rotor and provided in the machine housing, the fluid that flows in the machine housing and through a flow channel for the fluid, and the measurement element is provided in the flow channel.

21. An electrical machine comprising:

a rotor which is mounted such that it can rotate;

a machine housing;

a fixed-position stator associated with the rotor and provided in the machine housing;

a cooling device for cooling parts using a fluid within the machine housing, the cooling device having a flow channel for the fluid; and a flowmeter positioned in the flow channel to measure a flow direction of the fluid in the flow channel, the flowmeter comprising:

a measurement element around which the fluid flows, the measurement element comprising:

an optical waveguide to carry an electromagnetic wave, the electromagnetic wave being influenced by the temperature of the optical waveguide; and at least two electrical heating elements arranged adjacent to the optical waveguide, each heating element producing a respective heat flow when activated, the heating elements being positioned such that the respective heat flows proceed in opposite directions from the respective heating elements toward the optical waveguide, the amount of heat reaching the optical waveguide from the individual heating elements correlating to the flow direction of the fluid;

a control unit to successively in time supply electrical power to the at least two heating elements; and an evaluation unit to monitor temperature influences from the individual heat flows on the electromagnetic wave, and thereby determine the flow direction of the fluid.

22. The electrical machine as claimed in claim 21, wherein the measurement element is arranged radially with respect to a cross section of the flow channel.

23. The electrical machine as claimed in claim 21, wherein a plurality of measurement elements are arranged at an axially displaced distance from one another.

* * * * *